United States Patent [19]

Monroe

[11] 4,019,792
[45] Apr. 26, 1977

[54] BEARING ASSEMBLY
[75] Inventor: Robert C. Monroe, Houston, Tex.
[73] Assignee: Hudson Products Corporation, Houston, Tex.
[22] Filed: Apr. 29, 1976
[21] Appl. No.: 681,567
[52] U.S. Cl. .............................. 308/219; 416/154
[51] Int. Cl.[2] ........................................ F16C 19/00
[58] Field of Search .............. 308/15, 72, 78, 168, 308/188, 219, 202; 416/154, 220

[56] References Cited
UNITED STATES PATENTS

| | | | |
|---|---|---|---|
| 2,530,520 | 11/1950 | Hackethal et al. | 308/219 X |
| 2,739,655 | 3/1956 | Petty | 308/219 UX |

Primary Examiner—Joseph F. Peters, Jr.
Assistant Examiner—Gene A. Church
Attorney, Agent, or Firm—W. F. Hyer; Marvin B. Eickenroht

[57] ABSTRACT

There is disclosed a bearing assembly comprising first and second bearing elements arranged in axially spaced relation about a shaft which oscillates about its axis through a relatively small angle, the bearing element which sees thrust loading from the shaft comprising a radially inner bearing part having a conically shaped outer surface which is slidable over a similarly shaped inner surface of the outer bearing part.

8 Claims, 3 Drawing Figures

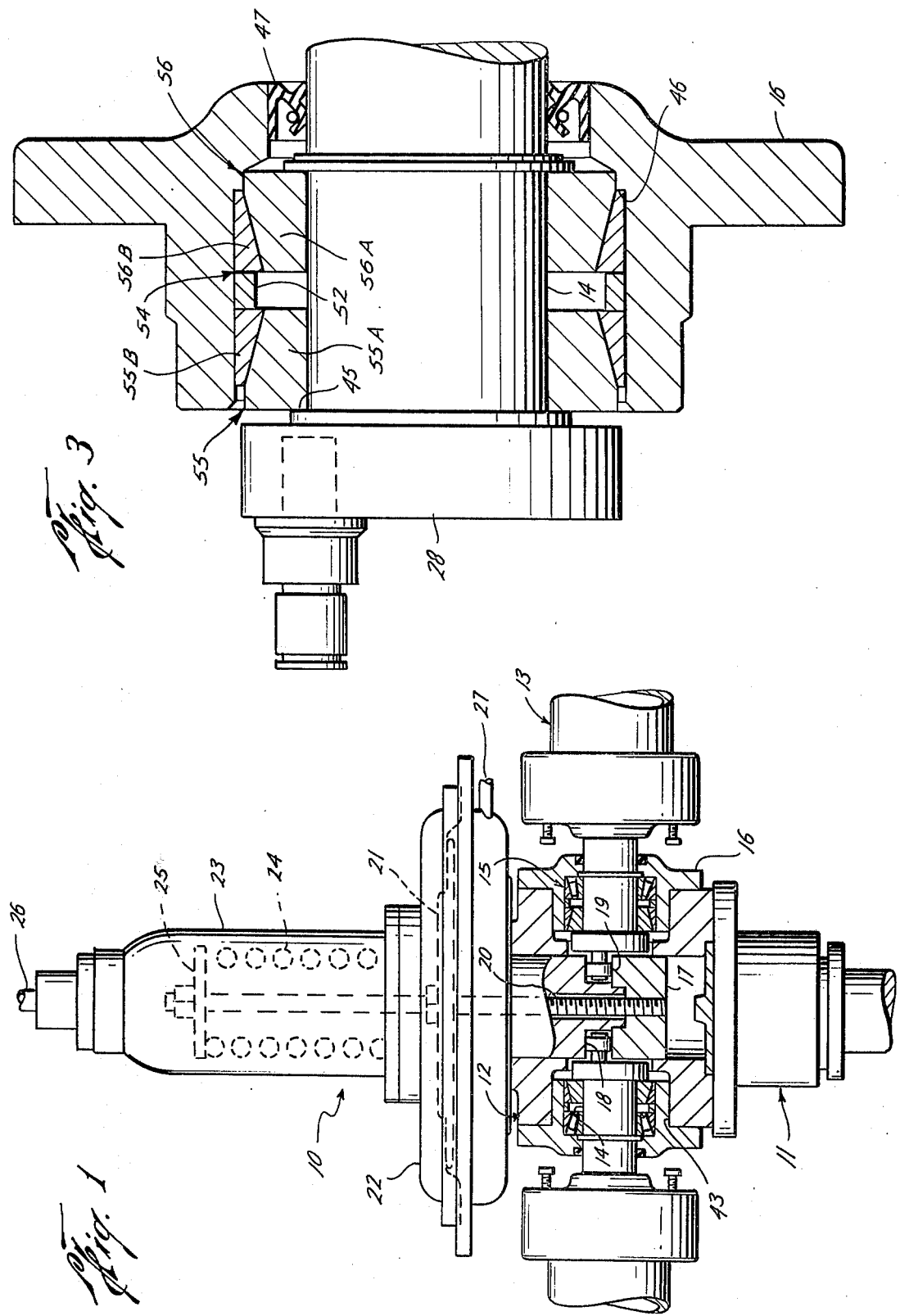

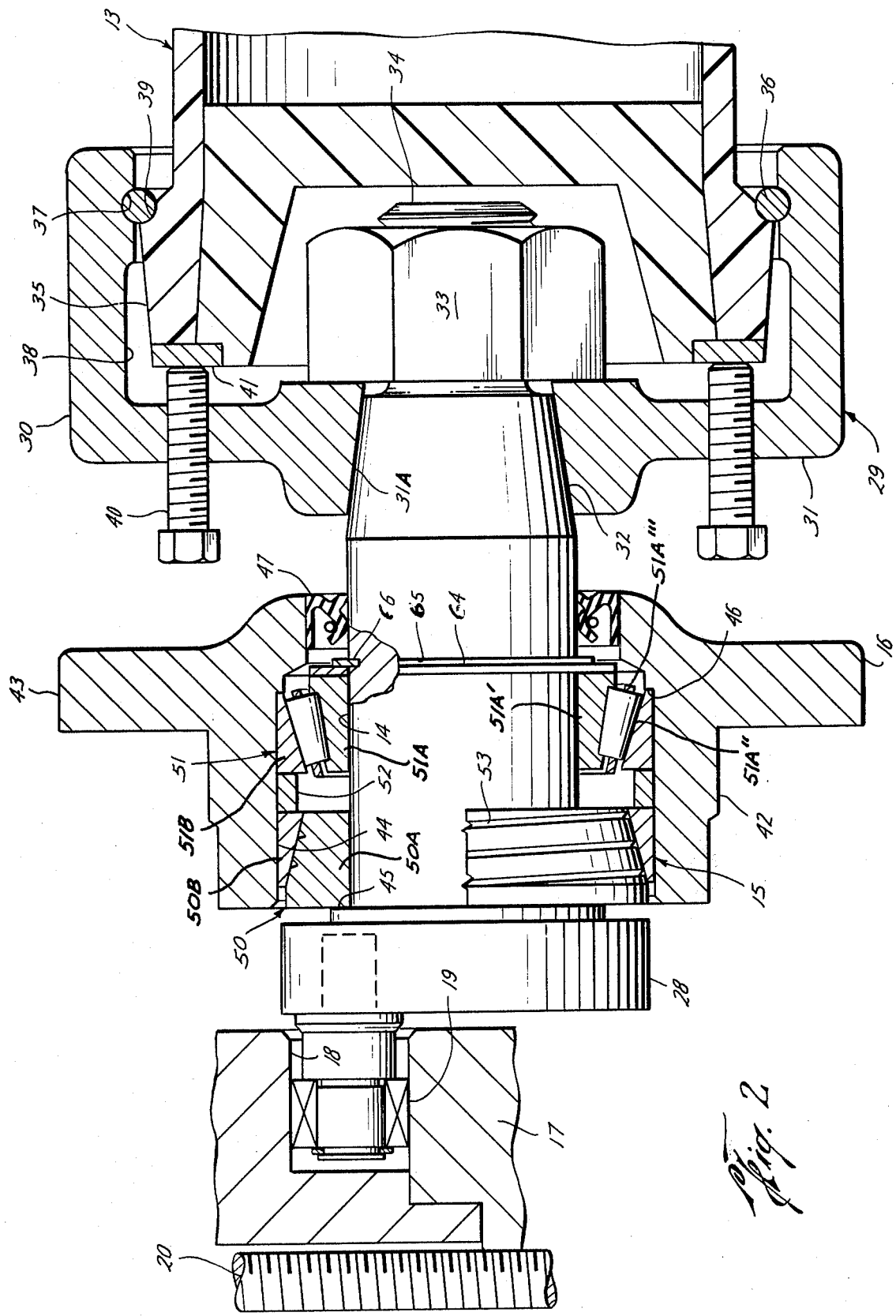

BEARING ASSEMBLY

This invention relates generally to a bearing assembly for a shaft; and, more particularly, to an improved bearing assembly which is especially well adapted to receive the thrust and radial loadings of a shaft which ordinarily oscillates through a relatively small angle about its axis which causes inferior lubrication for conventional type bearing assemblies.

In one of its aspects, this invention relates to a bearing assembly which is especially well suited for supporting the shaft on the end of a blade which extends radially from the hub of a large industrial axial flow fan, and wherein, as shown, for example, in U.S. Pat. No. 2,739,655, the shaft may be oscillated about its axis so as to permit the pitch of the blades to be adjusted during operation of the fan. As in any axial flow fan, the bearing assembly for each blade shaft is subjected to substantial thrust and radial loadings, the thrust loading resulting from the centrifugal force on the rotating blades, and the radial loading resulting from bending moments on the blades as they rotate through the air column. To resist these large loads, it has been the practice to support the shaft of each blade within a bearing assembly having friction-free, roller-type bearing elements, either of the ball or conical type. In either event, and even though only the inboard bearing element ordinarily sees thrust loading from the shaft, the bearing elements have been used in axially spaced pairs to provide a larger axial distance over which the bending moments are resisted.

Conical type roller bearings have been preferred because of their greater load capacities. Thus, when arranged with their axes diverging in directions away from one another, the rollers of the inboard and outboard bearing elements provide a maximum axial length over which they are effective in resisting radial loads. Also, conical type roller bearings are adjustable to take up for end play, and thus are effective to reduce wobble in the shaft. As well known in the art, friction-free bearing elements of this type operate within a suitable lubricant, which may be oil or grease, so as to reduce wear on the bearing surfaces between the rolling parts and the inner and outer races.

Wear is a particular problem in the case of friction-free bearings which support shafts which merely oscillate through small angles, because it is concentrated in the small number of the rolling elements which are loaded by the shaft, thus causing "brinneling" in the high stress areas. In the case of ball type roller bearings, wear is concentrated on small circular areas of only a few of the balls, and in the case of conical type roller bearings, wear is concentrated on small oval-shaped areas of only a few of the conically shaped rollers. The wear problem is made even worse when the rolling elements are not caused to rotate a full revolution about their own axes, and thus do not have an opportunity to relubricate themselves.

Since friction or sleeve type bearings provide a large cylindrical wear surface, they lessen much of the wear problems above discussed in connection with roller type bearings. Also, the wear surfaces of bearings of this latter type may be coated with dry type lubricants which avoid the need for oil or grease lubricants and also insure full coverage. Despite these advantages, friction-free type bearings are nevertheless used in bearing assemblies of the type described, not only because of their greater load bearing capabilities, but also because of the ability of at least the conical type to take up for end play, which cannot be taken up to the same degree with conventional friction or sleeve type bearing. Also, of course, a friction or sleeve type bearing would have to be of substantial length to provide the axial length necessary to resist radial loads due to bending moments.

The primary object of this invention is to provide a bearing assembly which is particularly well suited for an oscillatable shaft of the type above described in that it has the advantages of both friction-free, roller bearings and friction or sleeve bearings, but which nevertheless is of such construction that it may be made up of one or more parts of a standard conical type roller bearing.

This and other objects are accomplished, in accordance with the illustrated embodiments of this invention, by a bearing assembly which is similar to a standard conical type roller bearing in that each of the axially spaced first and second bearing elements which surround the shaft within the bearing housing includes a radially inner bearing part for rotation therewith about its axis and a radially outer bearing part which is held against rotation with the inner part, with a spacer being disposed between oppositely facing end surfaces of the outer bearing parts. More particularly, the outer bearing part of each bearing element has an inner conical surface over which the outer surface of the inner bearing part is slidable, the inner surface of the first bearing element being divergent in a direction toward an end surface of the shaft, and the inner surface of the second bearing element being divergent in a direction toward an end surface of the bearing housing. Thus, with an end surface of the inner part of the first bearing element engaged by the end surface of the shaft, and the other end surface of the outer part of the second bearing element engaging the end surface of the housing, thrust loading which is seen by the first bearing element is transmitted through the spacer to the second bearing element.

However, in accordance with the novel aspects of the present invention, the inner part of the first bearing element comprises a body having an outer surface which is conically shaped similarly to the inner surface of the outer part, whereby the first bearing element has the advantages of both a friction-free, roller type bearing and a friction or sleeve bearing. Thus, as in the case of a sleeve bearing, these conically shaped surfaces provide a large area over which wear is distributed. Furthermore, these conical wear surfaces may be lubricated by a dry film type lubricant. On the other hand, by virtue of their conical shapes, the surfaces on the inner and outer parts of the first bearing element are adjustable in an axial direction so as to permit take up for end play. Still further, at least the outer part of both bearing elements may be a cup from a standard friction-free, conical roller type bearing element.

In one embodiment of the invention, the second bearing element may comprise a standard friction-free, conical type bearing in which the inner part comprises an inner race or cone having a conically shaped outer surface and conically shaped rollers carried about the cone for rolling engagement with it and the inner conical surface of the cup. In another embodiment of the invention, the second bearing element is similar to the first in that its inner part comprises a body having an outer surface which is conically shaped similarly to the inner surface of the outer part for sliding engagement therewith during oscillation of the shaft.

The first embodiment may be preferred when it is desired to maintain friction in the bearing assembly at a minimum, having in mind also that since only the first or inboard bearing element sees thrust, the second or outboard bearing element may not have severe brinneling problems. On the other hand, the second embodiment reduces wear to a minimum and enables the bearing surfaces of both bearing elements to be lubricated with a dry film lubricant. In any event, both embodiments are effective in taking up for end play. Furthermore, this invention contemplates that the two embodiments may be carried interchangeably in the same bearing housing, which in turn may be a part of a standard friction-free roller bearing assembly.

In the drawings, wherein like reference characters are used throughout to designate like parts:

FIG. 1 is a side view, partially in elevation and partially in section, of an axial flow fan having blades extending radially from the hub thereof, and with shafts on the inner ends of blades mounted within bearing assemblies constructed in accordance with the first-described embodiment of the invention;

FIG. 2 is an enlarged sectional view of one shaft and bearing assembly of the fan of FIG. 1; and FIG. 3 is a view similar to FIG. 2, but showing the one shaft mounted within a bearing assembly constructed in accordance with the second-described embodiment of the invention.

With reference now to the details of the above-described drawings, the overall fan, which is indicated in its entirety by reference character 10, is shown in FIG. 1 to comprise a shaft 11 which is rotated by suitable means (not shown) about its vertical axis, a hub 12 connected to the shaft for rotation therewith, and a plurality of blades 13 mounted on and extending radially from the hub. More particularly, and as will be described in more detail to follow, a shaft 14 on the inner end of each blade is mounted in a bearing assembly 15 carried by a bearing housing 16 of the hub 12, so that, as previously described, it may be oscillated about its axis in order to adjust the pitch of the blade.

Each blade is so oscillated by a mechanism which is similar to that shown and described in U.S. Pat. No. 2,739,655, in that, as shown in FIG. 1, it comprises an actuator 17 mounted for vertical reciprocation within the hub 12 and cam slots 18 in its sides each to receive a cam follower 19 mounted eccentrically on the inner end of each shaft. Thus, as more fully described in the aforementioned U.S. patent, the slots 18 extend laterally of the actuator so that, as the actuator moves vertically, the cam followers 19 are raised and lowered to oscillate the shafts about their axes.

As shown in FIG. 1, the actuator is connected by means of a rod 20 to a diaphragm 21 extending across the interior of a diaphragm housing 22 mounted above the hub 12. As shown in broken lines in FIG. 1, rod 20 extends upwardly from the diaphragm into a dome 23 above housing 22, and is biased in an upward direction by means of a coil spring 24 which surrounds the rod and acts between the housing and a plate 25 at the upper end of the rod. The lower end of dome 23 is in fluid communication with the housing 22, so that air introduced through conduit 26 connecting with the upper end of the dome into housing 22 above diaphragm 21 provides a force urging the diaphragm downwardly, which is opposed by the upward force due to the spring. Thus, and again in a manner more particularly described in the prior patent, the actuator adjusts the pitch of the blades in response to the air pressure. A suitable lubricant may be introduced into the housing beneath the diaphragm, and thus into the hub, through a conduit 27.

As best shown in FIG. 2, cam follower 19 is mounted on a flange 28 on the inner end of the shaft inboard of bearing housing 16, and blade 13 is mounted on the outboard end of the shaft 14 by means of a coupling 29 to which blade 14 is releasably connected. The coupling comprises housing 30 which has a rear wall 31 with a tapered bore 31A therein for receiving a similarly tapered end 32 of shaft 14. The housing is releasably connected to the shaft by means of a nut 33 which is threaded over a pin 34 extending from the outer end of the shaft to fit tightly against the inner face of wall 31.

A shank 35 on the inner end of blade 13 is received within the open outer end of the housing 30 and releasably locked in place therein in a manner similar to that shown in U.S. Pat. No. 2,908,335. Thus, the outer circumferential portion of each of a pair of snap rings 36 is adapted to be received within a groove 37 in the cylindrical wall 38 of the housing, and the inner circumferential portion thereof is adapted to bear against an outwardly facing shoulder 39 on the shank. The shoulder on the shank is held tightly against the retainer ring by means of bolts 40 carried within the rear wall 31 of the coupling housing for movement toward and away from the rear wall 41 of the blade shank.

As will be understood from FIG. 2, and as more particularly described in the aforementioned U.S. Pat. No. 2,908,335, bolts 40 may be backed off to permit the blade shank 35 to be moved into the coupling housing to a position inwardly of that shown in FIG. 2, whereby retainer rings 36 may be moved into place within groove 37. The bolts 40 may then be moved against the outer end 41 of each shank to force the shoulder thereof against the retainer rings 36 so as to fixedly mount the inner end of the shank in the coupling.

Each bearing housing 16 includes a tubular portion 42 adapted to fit closely within a similarly shaped opening 43 in the side of the hub 12, and a flange 43 on the outer end of the tubular portion adapted to engage the outer side of the hub for connection thereto, as by means of bolts. When the bearing housing is so connected to the hub to mount bearing assembly 15 and shaft 14 thereon, it retains cam follower 19 on the inner end of the shaft within groove 18 in the actuator 17.

As best shown in FIG. 2, bearing assembly 15 comprises inboard and outboard bearing elements 50 and 51, respectively, carried in axially spaced relation within the annular space between the shaft and the inner circumference 44 of tubular portion 42 of the bearing housing. A seal ring 47 is carried by the bearing housing for sealing about shaft 14 to close the annular space outwardly of the bearing assembly. This, of course, prevents debris from entering the space and thus damaging the bearing assembly. Also, it contains lubricant which might fill the space.

Each bearing element 50 and 51 includes a radially inner bearing part 50A and 51A, respectively, which has a press fit about the shaft 14 for rotation therewith, and an outer bearing part 50B and 51B which fits tightly within the inner circumference 44 of the bearing housing so as to be held therewith against rotation with the inner bearing part. More particularly, the inner surfaces of outer bearing parts 50B and 51B, are conically shaped, with the conically shaped surface of part 50A diverging toward a shoulder 45 on the shaft, and the conically shaped surface or inner surface on the outer part 51A diverging toward a shoulder 46 on the bearing housing.

A spacer ring 52 is disposed between the oppositely facing end surfaces of the outer parts 50B and 51B, the inboard end surface of the inner part 50A of bearing element 50 is engaged by an end surface provided by shoulder 45 on shaft flange 28, and the outboard end surface of outer part 51A of bearing element 51 is engaged with an end surface provided by internal shoulder 46 of the bearing housing. Thus, upon rotation of the fan, the outward thrust on the shaft due to centrifugal force on the blade is imposed on bearing part 50A, and thus transmitted through spacer ring 52 and the outer bearing part 51B to the bearing housing.

As previously described, the inner part 50A of bearing element 50 comprises a body having an outer conically shaped surface which conforms to the inner bearing surface of outer part 50B so as to provide a large area of sliding surface therebetween. The inner part 51A of bearing 51, on the other hand, is similar to the inner bearing part of a standard conical roller type bearing in that it comprises an inner race or "cone" 51A' having an annular recess about its outer conical surface to receive conically shaped rolling elements 51A" held within a carrier 51A'" disposed about the inner body. Consequently, the outer bearing part provides an outer race or "cup," and the rolling elements are caused to have rolling engagement with the oppositely facing conical surfaces of both the cup and cone.

Oil or grease may be contained within the housing at a level above that of each annular bearing space so as to lubricate bearing assemblies 14, passages (not shown) being formed through the inner bearing part 50A to permit lubricant to flow past the inner bearing element. To facilitate the spread of the lubricant over the conical bearing surfaces between the inner and outer bearing parts of bearing assembly 50, a spiral groove 53 is formed in the outer conical surface of inner part 50A, connecting at one end with the left end of the outer bearing part and at its other end with the right end of the bearing part.

A ring 64 is carried about the shaft adjacent the right end surface of inner body 51A' so as to permit shims to be disposed therebetween in order to take up for end play in the bearing assembly. Ring 64 is releasably held in place by means of a snap ring 65 carried within a groove 66 about the shaft. Obviously, other means may be employed for enabling slack to be taken up in the assembly.

As will be appreciated, the outboard bearing element 51 may be a standard conical roller type. Also, at least the outer bearing part or race of the inner bearing element 50 may be identical to the outer race of the bearing element 51.

The bearing assembly constructed in accordance with the second embodiment of the invention, and indicated in its entirety in FIG. 3 by reference character 54, is shown in FIG. 3 to be carried within a bearing housing 16 and mounted about a shaft 14 which are identical to the housing and shaft bearing the same reference characters 1 and 2. Bearing assembly 54 includes an inboard bearing element 55 which is substantially identical to inboard bearing element 50 of bearing assembly 15, and an outboard bearing element 56 which is identical to inboard bearing element 55, except for the direction of divergence of the conically shaped inner surfaces of the outer bearing element and the outer surface of the inner bearing element.

Thus, bearing element 55 includes an inner bearing part 55A comprising a body having an outer conical surface thereon which diverges toward end surface 45 on the flange 28 of the shaft, and an outer bearing part 55B having an inner conical surface conforming to the outer conical surface of the part 55A and thus slidably engageable therewith over a large area. Outboard bearing element 56 includes an inner bearing part 56A and an outer bearing part 56B, such parts corresponding in size and shape to inner and outer bearing parts 55A and 55B, whereby they need merely be reversed end-for-end to permit them to be arranged with the conically shaped surfaces on their outer and inner surfaces diverging toward end surface 46 on bearing housing 16.

As in the case of bearing assembly 14, a spacer ring 52 is disposed between the end surfaces of outer bearing parts of the bearing elements 55 and 56 so as to hold them in axially spaced relation. Also, shoulder 45 on the shaft engages the end surface of inner bearing element 55 so as to impose the thrust load of the shaft thereon, and this load is in turn transmitted through spacer ring 52 and outer bearing part 56B of bearing element 56 to the end surface 46 of the bearing housing. As in the case of the first embodiment of the invention, the outer end of the bearing space in the bearing housing 16 is closed by a seal ring 47.

Although neither bearing element 55 nor bearing element 56 is a standard item, each includes outer bearing parts 55B and 56B which, and as will be apparent from the previous description of the first embodiment of the invention, may be identical to the cones of standard conical roller type bearings.

This embodiment contemplates that the conical surfaces of the inner and outer bearing parts of both bearing elements may be lubricated with a dry lubricant, such as a film or tape of low friction material between the surfaces. Alternatively, the annular space for the bearing elements may be filled with oil or grease, in which case passages (not shown) may be formed in each inner bearing part to permit the lubricant to have access to each bearing element.

From the foregoing it will be seen that this invention is one well adapted to attain all of the ends and objects thereinabove set forth, together with other advantages which are obvious and which are inherent to the apparatus.

It will be understood that certain features and subcombinations are of utility and may be employed without reference to other features and subcombinations. This is contemplated by and is within the scope of the claims.

As many possible embodiments may be made of the invention without departing from the scope thereof, it is to be understood that all matter herein set forth or shown in the accompanying drawings is to be interpreted as illustrative and not in a limiting sense.

The invention having been described, what is claimed is:

1. In combination with apparatus which includes a bearing housing and a shaft which is disposed concentrically within the housing to provide an annular space between its outer circumference and the inner circumference of the housing, and wherein the outer circumference of the shaft and the inner circumference of the housing have oppositely facing end surfaces at opposite ends of the space; a bearing assembly comprising first and second, bearing elements surrounding the shaft within the space in axially spaced relation, each bearing element including a radially inner part which is rotatable with the shaft and a radially outer bearing part which is held against rotation with the inner part, and a spacer disposed between oppositely facing end surfaces on the outer bearing parts of the first and second bearing elements, the outer part of each bearing element comprising a body having a conically shaped inner surface over which the outer surface of the inner part thereof is slidable, with the conically shaped surface of the first bearing element being divergent in a direction toward the end surface of the shaft, and the conically shaped surface of the second bearing element being divergent in a direction toward the end surface on the housing, an end surface on the inner part of the first bearing element being engaged by the end surface on the shaft, so as to receive the thrust of the shaft, and the other end surface on the outer part of the second bearing element engaging the end surface of the housing, whereby thrust loading is transmitted from the first bearing element through said spacer and outer part of the second bearing element to said housing, and said inner part of the first bearing element comprising a body having a conically shaped outer surface which conforms to and is slidable over the conically shaped inner surface of the outer part thereof.

2. A bearing assembly of the character defined in claim 1, wherein the inner part of the second bearing includes an inner body and conically shaped rollers carried about the inner body for rolling engagement with it and the inner conical surface of the outer part thereof.

3. A bearing assembly of the character defined in claim 2, wherein the outer parts of the bearing elements are identical except for the direction of divergence of their inner conical surfaces.

4. A bearing assembly of the character defined in claim 1, wherein said inner part of the second bearing element comprises a body having a conically shaped outer surface which conforms to and is slidable over the conically shaped inner surface of the outer part thereof.

5. A bearing assembly of the character defined in claim 4, wherein the inner and outer parts of the bearing elements are identical except for the direction of divergence of their outer and inner conical surfaces, respectively.

6. A bearing assembly of the character defined in claim 1, wherein the outer parts of the bearing elements are identical except for the direction of divergence of their inner conical surfaces.

7. A bearing assembly of the character defined in claim 1, wherein a dry lubricant is disposed between the conically shaped surfaces of the bearing parts of the first bearing element.

8. A bearing assembly of the character defined in claim 1, wherein a spiral groove is formed in the conically shaped surface of at least one bearing part of the first bearing element to permit oil or grease to pass therethrough for lubricating both bearing elements.

* * * * *